(12) United States Patent
Gade et al.

(10) Patent No.: US 7,325,867 B2
(45) Date of Patent: Feb. 5, 2008

(54) JACK BRACKET AND METHOD FOR THE PRODUCTION THEREOF

(75) Inventors: Juergen Gade, Buxtehude (DE); Heinz Koslowski, Gerlingen (DE); Joachim Neumann, Albershausen (DE); Rudolf Nowak, Boeblingen (DE); Frank Schmuck, Hamburg (DE)

(73) Assignee: DaimlerChrysler AG, Stuttgart (DE)

( * ) Notice: Subject to any disclaimer, the term of this patent is extended or adjusted under 35 U.S.C. 154(b) by 81 days.

(21) Appl. No.: 10/558,440

(22) PCT Filed: May 18, 2004

(86) PCT No.: PCT/EP2004/005320

§ 371 (c)(1),
(2), (4) Date: Nov. 28, 2005

(87) PCT Pub. No.: WO2004/106130

PCT Pub. Date: Dec. 9, 2004

(65) Prior Publication Data

US 2007/0029842 A1     Feb. 8, 2007

(30) Foreign Application Priority Data

May 28, 2003   (DE) .............................. 103 24 275

(51) Int. Cl.
*B60S 11/00*     (2006.01)
(52) U.S. Cl. ........................................... 296/209
(58) Field of Classification Search ............... 296/209
See application file for complete search history.

(56) References Cited

U.S. PATENT DOCUMENTS 4,965,915 A     10/1990  Steininger

FOREIGN PATENT DOCUMENTS

| DE | 840 055 C | 5/1952 |
|---|---|---|
| DE | 1 096 227 B | 12/1960 |
| DE | 42 23 563 C1 | 9/1993 |
| DE | 4322433 | * 8/1994 |
| DE | 44 25 633 C1 | 11/1995 |
| DE | 195 28 309 C2 | 3/1998 |
| DE | 19831548 | * 10/1999 |

* cited by examiner

*Primary Examiner*—Dennis H. Pedder
(74) *Attorney, Agent, or Firm*—Akerman Senterfitt; Stephan A. Pendorf; Yonghong Chen

(57) ABSTRACT

The invention relates to a jack bracket (12) for a motor vehicle, which is fixed to a sill of the motor vehicle with flanges and an opening (16) for a receiving element in which the jack is placed. The invention also relates to a method for the production of said bracket (12). In order to simplify the production and configuration of the bracket (12) without comprising its stability, the bracket (12) is comprised of a tubular hollow profile (6) and a lid (13), which is fixed on the end (10) opposite the sill of the hollow profile (6) covering said end (10) and which has the opening (16) for the receiving element.

22 Claims, 4 Drawing Sheets

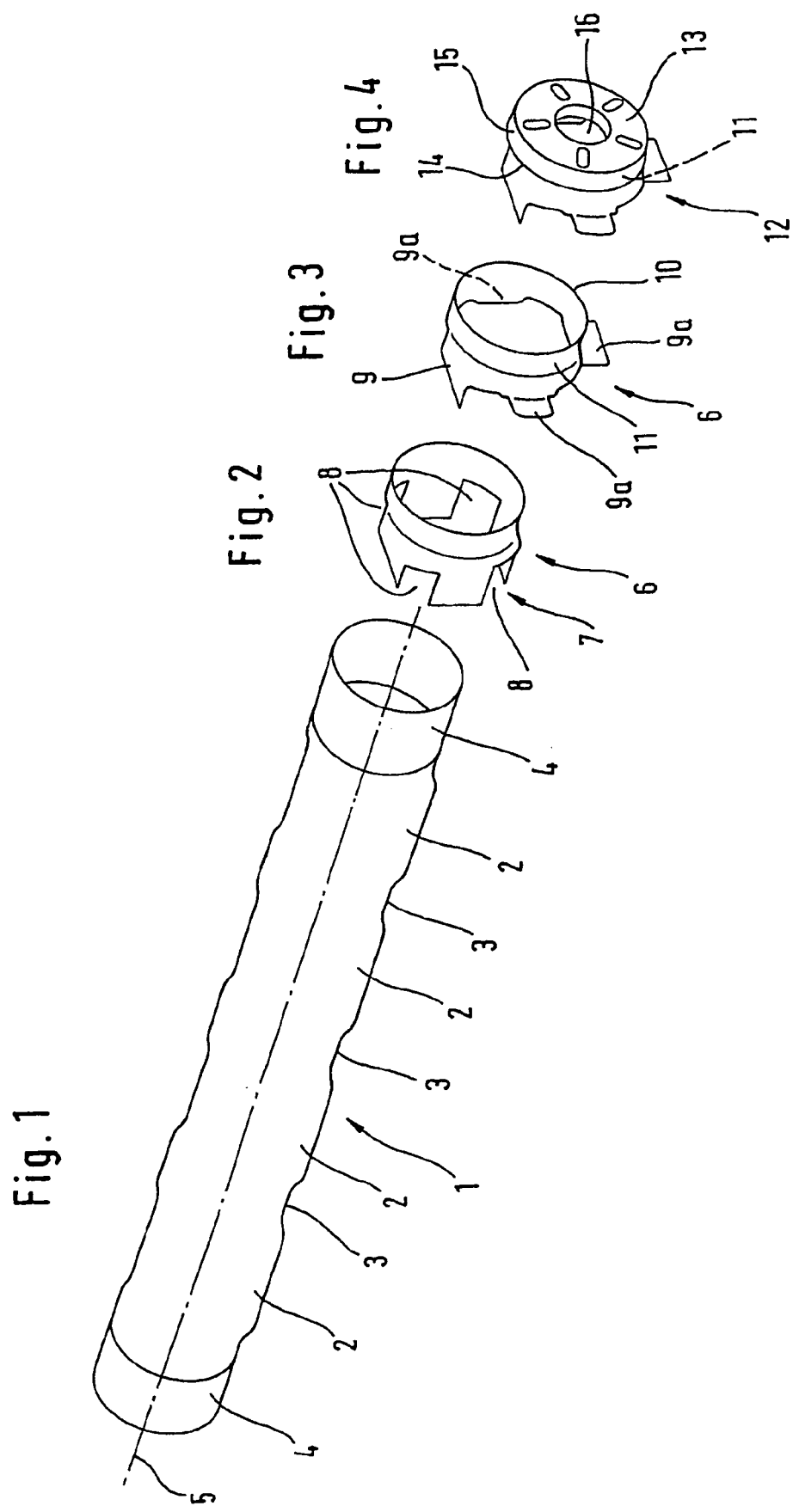

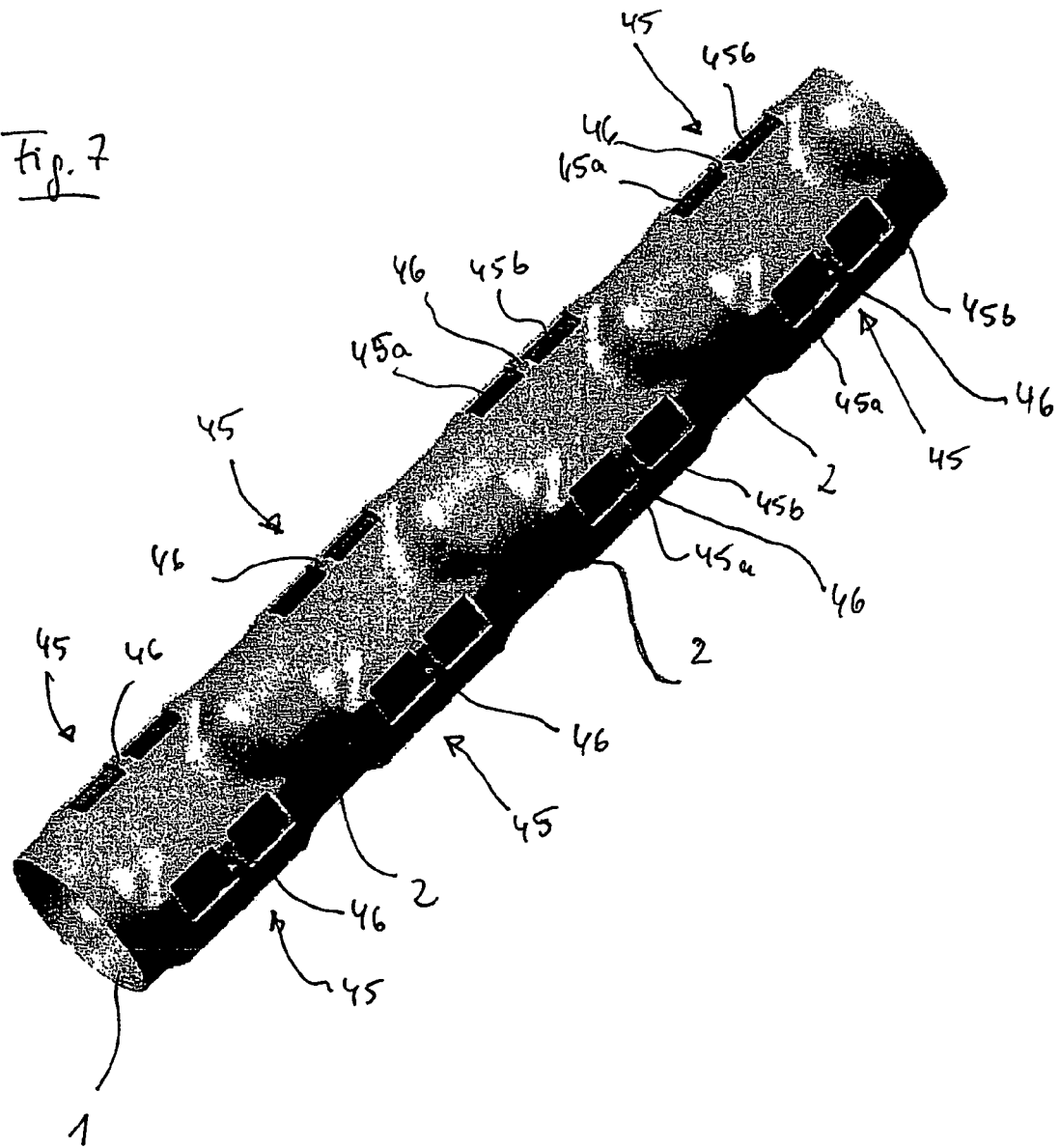

JACK BRACKET AND METHOD FOR THE PRODUCTION THEREOF

CROSS REFERENCE TO RELATED APPLICATION

This application is a national stage of PCT/EP2004/005320 filed May 18, 2004 and based upon DE 103 24 275.9 filed May 28, 2003 under the International Convention.

BACKGROUND OF THE INVENTION

1. Field of the Invention

The invention relates to a jack bracket and to a process for producing it.

2. Related Art of the Invention

A bracket and a process of the generic type are known from DE 195 28 309 C2. The bracket described in that document is formed from a sheet-metal shell structure and has attachment regions, by way of which it is secured by spot-welding to a lower sill region. At its other end, the welded shell structure has an opening into which a plastic stopper is fitted, the plastic stopper having an indentation into which a pin of a jack can be inserted. The shell structure of the bracket is relatively complex to produce in terms of process engineering and apparatus, on account of its multi-part nature. Furthermore, its design has to be specifically adapted, in a complex way, to the introduction of forces into the bracket when a vehicle is being jacked up, so that the structure is prevented from buckling as a result of overloading.

DE 840 055 C shows a device for loading, towing and the like motor vehicles, which is arranged in the floor region of the motor vehicle. The device serves the purpose of enabling the vehicle to be transported away or moved to a completely different location in a simple way. For this purpose, two cross-beams of the body are reconfigured in such a manner that they conceal attachment means to which a hook can be attached from the outside. A crane or similarly heavy and extensive lifting apparatus is required to lift the motor vehicle. According to FIGS. 4, 6, 8, 10 and 12, the cross-beam is welded to a longitudinal beam. As shown in FIG. 12, a cover is arranged at that end of a hollow profiled section formed by the cross-beam which is close to the sill.

DE-A-1096227 has disclosed a bracket for a jack which is formed from a hollow profiled section in the form of a tube section. For this purpose, the document shows a sleeve-like stopper which guides the jack. The stopper has an aperture of considerable cross section, and the jack penetrates all the way through it.

U.S. Pat. No. 4,965,915 just shows a stopper for a lifting platform to bear against a motor vehicle body, with the stopper merely being pressed into an opening in a metal body panel. The stopper acts as the receiving element.

SUMMARY OF THE INVENTION

The invention is based on the object of further developing a bracket of the generic type and a process of the generic type in such a way that the production and design of the bracket are simplified without having to accept any loss of stability.

Designing the bracket as a hollow profiled section which at one end is provided with a cover that includes the opening for receiving a jack makes it possible to dispense with the use of a complex shell construction. The circumferentially continuous hollow profiled section, which can be formed in a simple way from a drawn tube, a sheet-metal section which has been rolled and then longitudinally welded, or an extruded section, has a high flexural and torsional strength, with the result that the bracket can readily withstand high mechanical stresses, such as those which are produced when jacking up an automobile. The hollow profiled section only has to be joined to the cover, which means that it is possible to use numerous joining techniques which can be implemented without major outlay, such as resistance spot welding, laser welding, adhesive bonding, riveting or a combination of these processes. A further advantage of this two-part configuration of the bracket, comprising hollow profiled section and cover, consists in the fact that if the bracket is overloaded, as occurs for example when the motor vehicle is driven onto and off a sidewalk in order to be parked thereon, only the cover is deformed and it alone absorbs the overloading. However, the hollow profiled section remains undamaged. It is then easy and inexpensive for the cover to be detached from the hollow profiled section and replaced by a new cover in the workshop using standard repair processes. This also greatly reduces the repair time compared to that of standard brackets which have been damaged. The deformation properties of the bracket according to the invention which have been demonstrated can be enhanced further by a suitable configuration of the geometry and materials of the cover and hollow profiled section.

According to the invention, the hollow profiled section is formed by a hydroformed part. The hollow profiled section is in this case formed from a tubular blank which is expanded by means of hydroforming. The hydroforming allows the hollow profiled section to be ideally matched to the periphery of the bracket, and these adaptations manifest themselves in expansions which are easy to form in the hydroforming process, on account of relatively small degrees of deformation. On account of the freedom of manufacturing tolerances of the process, it is easy to automate the attachment of the bracket to the lower region of the motor vehicle sill. The hydroforming pressure forms at least two expanded sections, which are axially spaced apart from one another, from the blank, and these sections are then divided into separate hollow profiled section by means of a dividing process. In this case, a plurality of hollow profiled sections can be formed simultaneously by a single forming operation, by means of the subsequent dividing process, which takes place, in a manner which is economical in terms of the process, within the hydroforming tool, which is of benefit to mass production of the bracket with a short working cycle. It is in this case possible for differently shaped hollow profiled sections to be formed from a common blank.

In a further preferred embodiment of the invention, the connecting flanges are formed out of wall parts of the hollow profiled section. This makes it possible to dispense with the need for additional, separate metal flange sheets, which keeps the number of components at a low level, and also to dispense with the fitting of such metal flange sheets to the hollow profiled section, which obviates unnecessary joining outlay. Moreover, the integral nature of the flanges with the hollow profiled section enhances the stability of the bracket with respect to mechanical stresses. A corresponding particularly preferred refinement of the process according to the invention with regard to the design of the flanges. In this case, wall sections are simply notched or cut out at that end of the hollow profiled section which is remote from the cover. The missing wall sections reduce the weight of the hollow profiled section, which is of benefit to reducing the overall weight of the motor vehicle. The notching or cutting can be realized after the forming of the hollow profiled section by means of hydroforming, with the hydroforming pressure still present in the same hydroforming tool, which constitutes an economic process. Furthermore, at least some of the wall parts which, are spaced apart from one another by the gap that is formed and form residual flanges, is angled off, an operation which takes place outside the hydroforming tool. Suitable angling of this nature optimizes the matching of the attachment of the hollow profiled section to the position of the attachment surfaces of the sill region and of other adjoining body regions, in order to enable the bracket to be joined to these regions quickly and durably. It is advantageous to use a joining process such as resistance spot welding, laser welding, soldering or double-bend joining for this purpose. To save weight, it is possible for large-area flanges to be formed in "garden fence" fashion, for example by notching. In this case, however, the outlay involved in the seam sealing which is to be applied to avoid crevice and edge corrosion is increased.

In a further particularly preferred refinement of the bracket according to the invention, the cover has a sleeve-like extension, by means of which the cover is fitted onto the hollow profiled section. This allows the cover to be positioned on the hollow profiled section in a simple way without having to provide any holding device whatsoever. In addition, on account of the double-walled nature produced by the overlay of hollow profiled section and cover which occurs in the attachment region, the strength of the hollow profiled section is increased. In a further preferred embodiment of the corresponding process according to the invention, a sheet-metal section is used to produce the cover by being deep-drawn to form a cap-like cover at a very low cost. The cover produced in this way is preferably centrally perforated, in particular stamped, which can be done in the deep-drawing tool, thereby reducing the outlay on apparatus. For this purpose, a progressive compound tool can be used to improve the economics of manufacture.

In a preferred refinement of the process according to the invention for this purpose, the cap-like perforated cover is fitted onto the hollow profiled section and then joined to the hollow profiled section, preferably by welding, around the region of the end face of its cylindrical edge, which forms the abovementioned sleeve-like extension. On account of the plug-fit connection, it is in this case possible for the cover and hollow profiled section to be joined to one another particularly durably and nonreleasably by means of a fillet weld, which is very simple to execute in terms of process engineering, around the end face of the edge. In addition to fillet welding, there are conceivable alternative joining techniques which are simple to carry out, for example double-bend joining and spot-welding.

In a further preferred configuration of the invention, the cover has a base region which is substantially planar in form. This makes it easier to adapt the bearing contact between the receiving element and the cover, with better introduction of force into the bracket being achieved as a result of the uniform bearing contact achieved. Furthermore, mounting of the receiving element is facilitated, since the simple bearing contour produces a well-defined stop for the receiving element.

In a preferred refinement of the invention, the cover, in the installed position of the jack bracket in the motor vehicle, is oriented parallel to the roadway over the entire base region. This prevents difficult and unsafe attachment of the jack to the receiving element of the jack bracket.

The cover has beads in the base region, which impart an improved strength to the cover and therefore the bracket.

In a further preferred configuration of the invention, the cover has positioning holes for a mounting device in the base region. These holes are used for accurate fixing of the cover, after which the latter, when assembled with the hollow profiled section, always adopts the correct relative position. Moreover, the fixing allows defined positioning of the assembled and joined bracket to the sill, so that the connecting flanges bear accurately against it in the desired position. The result of this is that the join between bracket and sill can be made using a more reliable process, which is of benefit to the durability of the join when driving. A further advantage of forming the positioning holes is based on the fact that the liquid used in the cathodic dip-coating painting process and liquid which enters it when driving, such as water or oil, can run out of the bracket, so that on the one hand the receiving element can be mounted without obstacle and on the other hand the risk of corrosion to the bracket is minimized.

Further, the invention relates to the different size of the positioning holes. This rules out the risk of workers confusing the position of the bracket, since otherwise an identical position of the cover of the bracket rotated through 180° would be possible with regard to the positioning holes.

A further particularly preferred configuration of the invention demonstrates that the central opening of the cover is delimited by a collar set toward the hollow profiled section. The collar on the one hand increases the strength of the cover and therefore of the bracket and on the other hand simplifies joining of the receiving element to the cover, which joining element, to form the join, can be pressed into the opening in the cover, for example by means of a central pin of the receiving element. As an alternative, joining by means of clipping is particularly advantageous and reliable. The central openings in the cover can advantageously also be used for the production process of the motor vehicle using overhead or skid conveying. This is because the openings all form receiving points in identical positions, which on account of the resulting simplified referencing of the position of the vehicle, is of benefit to the workstation-based production, which is generally sensitive to tolerances, such as for example axle assembly.

In a particularly preferred refinement of the invention, the receiving element is formed by a stopper, which preferably consists of plastic. This means with regard to the receiving element that it is formed by an inexpensive component which is easy to apply to the cover, for example by being pressed into the cover opening.

In a further preferred refinement of the invention, the stopper, on its side facing the cover, has at least one clip element, which interacts in a connecting manner with the central opening of the cover. This makes it easy to fit the stopper to the cover, with the clip element engaging behind the edge of the opening in the cover, in particular the collar.

In a further particularly preferred configuration of the invention, the circumferential outer side of the stopper, in the securing position, ends flush with the cylindrical edge of the cover or is set back therefrom. This ensures reliable introduction of forces into the bracket, preventing buckling of the stopper in the event of impact loads, which would occur in the event of the stopper projecting beyond the edge of the cover. Working on this basis, the cover and the stopper as well as the attachment cross section of the hollow profiled section to the cover may be of any desired cross-sectional shape.

In a further particularly preferred refinement of the invention, the end side of the stopper which is remote from the cover is pre-offset downward with respect to surrounding components, which are critical in terms of damage, of the motor vehicle. This prevents damage to surrounding components of the vehicle which are expensive to repair, such as for example the rear axle, exhaust system, equipment, longitudinal beams and cross-beams of the body, as a result of excessive mechanical impact stresses, for example when the vehicle is grounded on the edge of a curbstone when driving onto and off the curb. Of course, in this case too an appropriate selection of the positioning of the jack brackets on the vehicle underbody plays an important role.

The bracket according to the invention therefore serves not only for the attachment of a jack when changing a wheel but advantageously also as an impact or shock protection for the abovementioned vehicle components.

In a further preferred refinement of the invention, the contour of the wall parts, which form connecting flanges of the hollow profiled section and the contour of the sill are designed to be of corresponding shape to one another in the attachment region of the bracket, so that it is easy to reliably attach the bracket to the sill, ensuring a durable connection.

A further preferred refinement of the invention consists in the fact that the brackets on the sill in front of the rear wheel and behind the front wheel of the motor vehicle are identical in form. This simplifies the production process, on account of minimizing the outlay on apparatus.

In a further preferred refinement of the invention, the bracket is located outside the component separation between a sill panel and an underbody panel of the motor vehicle, the bracket with the receiving element projecting through an opening in the underbody panel. This makes it easy to replace the cover with the receiving element in the event of damage, since all that is required is to remove the underbody panel. There is no need for expensive dismantling of the sill panel.

A further particularly preferred embodiment of the process according to the invention. Accordingly, the blank, following the forming operation, is divided between the expanded sections, transversely with respect to the longitudinal axis of the blank, to form individual blank sections, which are then divided approximately in the middle by a dividing process taking place transversely with respect to the axial extent of the blank section, into in each case two hollow profiled sections. In this case, the expansion of the sections of the blank is used, by means of a symmetrical dividing cut, to create absolutely identical double parts in a simple way, with the result that on the one hand it is possible to make particularly good use of the capacity of the forming tool and on the other hand mass production can be enhanced and the working cycle required for manufacture of the bracket can be accelerated.

The dividing process can take place within the hydroforming tool—as has been mentioned—although this restricts the versatility of use of different process options. For example, in this case mainly mechanical dividing methods, such as stamping or dividing by means of a rotating blade, are practical. It is equally conceivable for the dividing to be carried out subsequent to the hydroforming process, outside the forming tool. This makes it possible to use still further dividing processes. In this case, laser cutting or plasma cutting are also appropriate.

In a further preferred embodiment of the process according to the invention, the unexpanded ends of the blank are cut off after the forming operation. This prevents the end-side blank material, which is pinched and consequently may be damaged by the axial rams which axially seal off the blank during the hydroforming operation, from being used to form the bracket, which would make it impossible to ensure the operating strength thereof. Furthermore, this end unnecessarily lengthens the hollow profiled section, and its shape is also not suitably matched to the installation conditions. Furthermore, an end of this type entails completely unnecessary additional weight. The ends are cut off in order to avoid these drawbacks.

In a further particularly preferred refinement of the invention, the notching takes place during or following the hydroforming of the hollow profiled section with the hydroforming pressure still present in the hydroforming tool, which is of particular benefit in terms of process economics, since it avoids sink marks which undesirably alter the shape of the flanges.

BRIEF DESCRIPTION OF THE DRAWINGS

The invention is explained in more detail below on the basis of an exemplary embodiment illustrated in the drawings, in which:

FIGS. 1-4 each show a perspective view of successive stages of the progress of production of a bracket according to the invention, FIG. 7 shows a perspective view of an expanded tubular blank with notched formations.

DETAILED DESCRIPTION OF THE INVENTION

Figure 5:
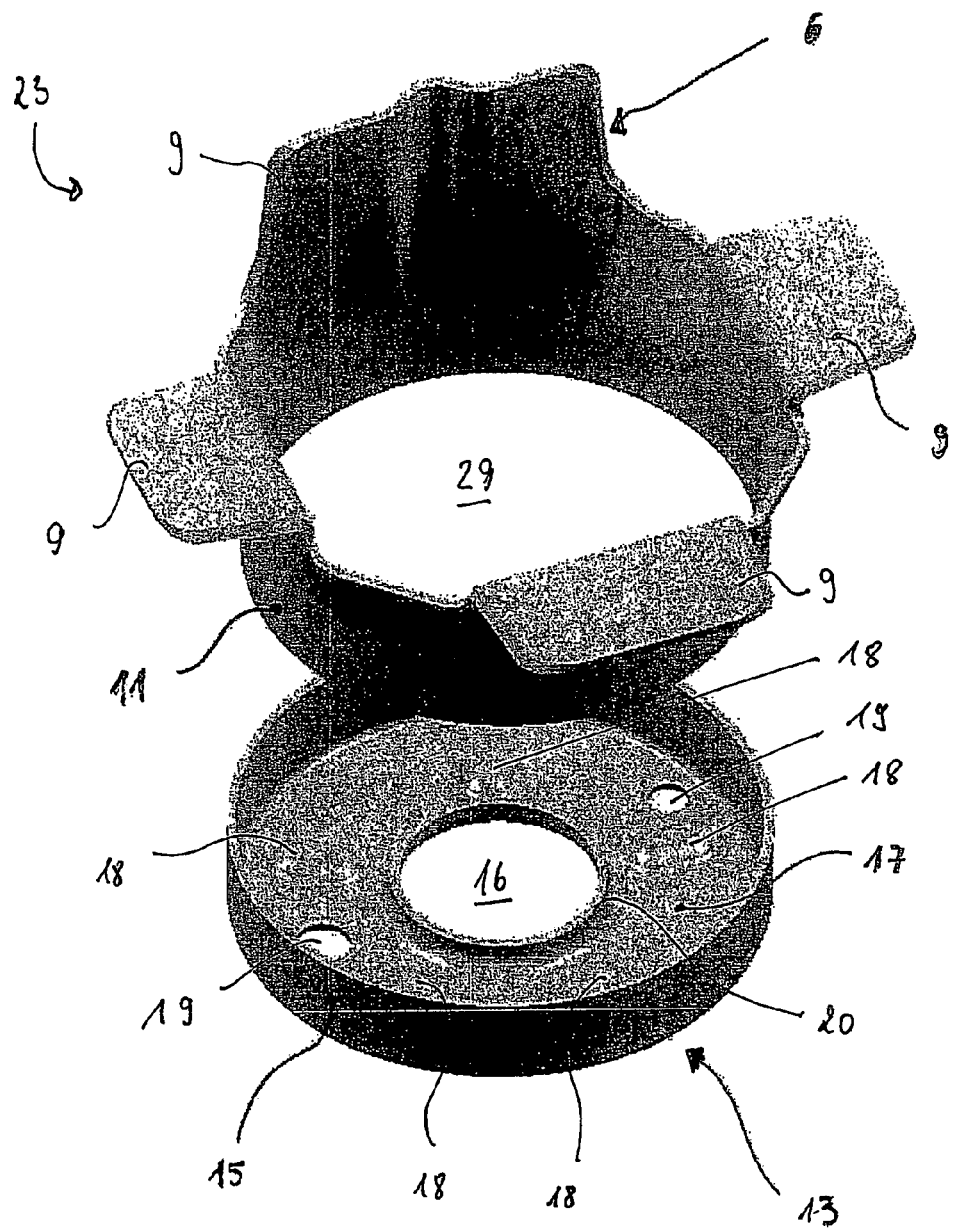
FIG. 5 shows a perspective view of a cover and a hollow profiled section before they are assembled to form a bracket according to the invention.

FIG. 1 illustrates an elongate tubular blank 1 which has been expanded by means of hydroforming and has a plurality of (in this case: four) expanded sections 2 which are axially spaced apart from one another. The blank 1 has short unexpanded sections 3 between the sections 2.

After the deformed blank 1 has been removed from the hydroforming tool, its unexpanded ends 4 which have remained undeformed are cut off. At the same time or thereafter, the blank 1 is divided transversely with respect to the blank longitudinal axis 5, at the location of the short sections 3, to form individual blank sections. These blank sections are then divided approximately in the middle, by a further dividing process carried out transversely with respect to the axial extent of the blank section, to form in each case two hollow profiled sections 6, a single one of which is illustrated in FIG. 2. Wall sections are notched or cut out at that end 7 of the circumferentially continuous hollow profiled section 6 which is remote from the cover, leaving clear gaps 8.

Some 9a of the remaining wall parts 9, which are spaced apart from one another in the circumferential direction by the gaps 8 which have been formed and form the flanges of the bracket 12, are then angled off, in order to be matched to the attachment flanges of the sill region and of the surrounding body region, so that the bracket 12 can easily be joined to the sill and surrounding body parts at the attachment surfaces. At that end 10 of the hollow profiled section 6 which is close to the cover, the hollow profiled section 6 has a virtually circular circumferential region 11, onto which a cover that is to be joined can be fitted (FIG. 3). Forming the circumferential region 11 makes it easier to fit on the cover.

FIG. 4 now shows the completed jack bracket 12. To achieve this state, a cap-like cover 13, which has been deep-drawn from a sheet-metal section and has been centrally perforated, in particular stamped, so as to form an opening 16 for the receiving element, to which the jack can be fitted, has been fitted onto the circumferential region 11 of the hollow profiled section 6. In the region of the end face 14 of the cylindrical edge 15, forming the sleeve-like extension, of the cover 13, the latter has been joined to the hollow profiled section 6, preferably by welding.

FIG. 5 illustrates the jack bracket 12 prior to its assembly, illustrating that the cover 13 has a base region 17 which is substantially planar in form. Furthermore, in the base region 17 the cover 13 has beads 18 which are arranged offset by in each case 72° with respect to one another in the circumferential direction of the circular base region 17, in the form of a five-pointed star. In addition, positioning holes 19 for a mounting device, which are of different sizes, are formed in the base region 17. Moreover, the cover 13 has a collar 20 which is set toward the hollow profiled section 6 and delimits the central opening 16 formed in the base region 17 of the cover 13. Although for assembly, which has already taken place in FIG. 4, the circumferential region 11 of the hollow profiled section 6 is fitted into the cover 13, so as to bear against its edge 15, and is joined to the latter, preferably by welding, adhesive bonding or double-bend joining, it is also conceivable for the dimensions of the cover 13 and hollow profiled section 6 to be such that the edge 15 of the cover 13 is fitted into the through-opening 29 in the hollow profiled section 6 and then to be fixedly joined to the circumferential region 11. FIG. 5 also particularly clearly reveals the wall parts 9 of the hollow profiled section 6 or the subsequent jack bracket 12 which form the securing flanges.

Figure 6:
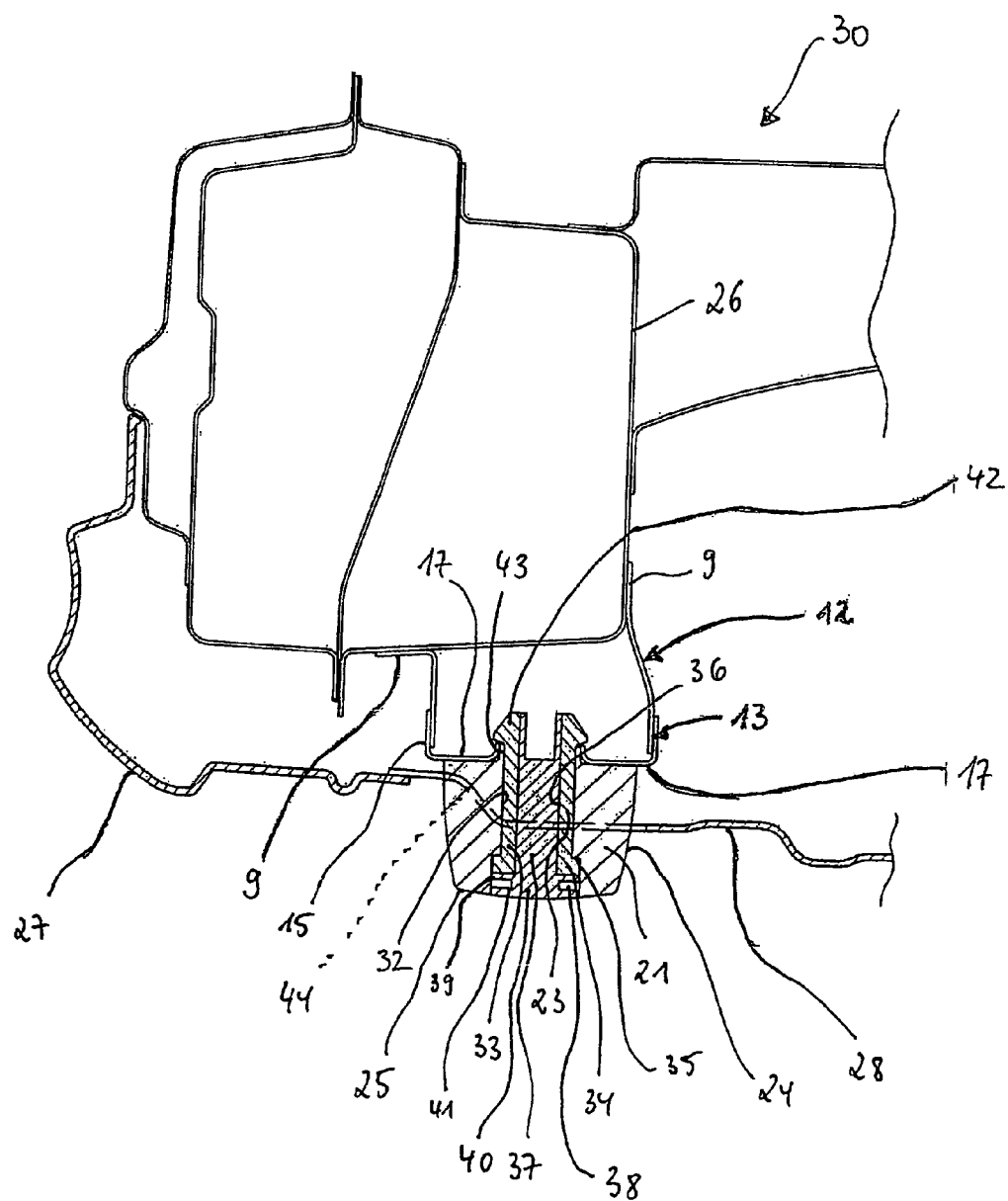
FIG. 6 shows a cross-sectional illustration of a jack bracket according to the invention in the installed position on a motor vehicle.

In FIG. 6, the jack bracket 12 according to the invention has been installed in the motor vehicle 30. In this case, the cover 13 of the bracket 12 is oriented parallel to the roadway over the entire base region 17. The bracket 12 on the sill 26 in front of the rear wheel and behind the front wheel of the motor vehicle 30 are identical in form. Moreover, the contour of the wall parts 9, which form connecting flanges, of the hollow profiled section 6 and the contour of the sill 26 are designed to be of corresponding shape to one another in the attachment region of the bracket 12, so as to produce gap-free bearing contact between them and therefore a particularly durable connection.

The receiving element of the bracket 12 is formed by a stopper 21, which preferably consists of plastic and the circumferential outer side 24 of which, in the securing position, is located set back from the cylindrical edge 15 of the cover 13. That side 22 of the stopper 21 which faces the cover bears against the underside 31 of the cover 13 without leaving any gaps. Furthermore, the stopper 21 has a central through-bore 32, through which a clip element 23 projects. The clip element 23 is hollow in form and at its end 33 remote from the cover has a ring collar 34, by means of which the clip element 23 bears against a stepped shoulder 35 of the through-bore 32. A plug 37 has been pressed into the cavity 36 in the clip element 23, securing the clip element 23 in the through-bore 32 in the stopper 21 and covering the ring collar 34 with respect to the outside by bearing against it. The plug 37 is additionally secured in the through-bore 32 by a securing ring 38, which is recessed into a receiving groove 41 formed at the circumference 39 of the head 40 of the plug 37. The head 40 of the plug 37 ends flush with that end side 25 of the stopper 21 which is remote from the cover. That end side 25 of the stopper 21 which is remote from the cover is pre-offset downward with respect to surrounding components of the motor vehicle 30 which are critical in terms of damage. At its end 42 which is close to the cover, the clip element 23 is designed in the form of an encircling anchor hook, which projects through the central opening 16 in the cover 13 and engages around the encircling collar 20 there, so as to fit the stopper 21 to the cover 13. The plug 37 is designed to be hollow over the length of the hook, so that the hook is provided with sufficient elasticity to be able to yield radially inward when it has been pushed into the cover opening 16 and then to spring back into the securing position behind the collar 20. The clip element 23 therefore interacts in a connecting manner with the central opening 16 of the cover 13. The stopper 21 also has a hollow, central short neck 43, which has been fitted into the opening 16 and bears against the inner side of the collar 20. In the installed position, the hook of the clip element 23, by way of the collar 20, encloses the neck 43. The cover 13 is particularly reliably held by virtue of the resulting positively and frictionally locking connection of the stopper 21 to the cover 13.

The bracket 12 is located outside the component separation between a sill panel 27 and an underbody panel 28 of the motor vehicle 30 and by means of the receiving element, i.e. the stopper 21, projects through an opening 44 in the underbody panel 28.

Finally, FIG. 7 illustrates a hollow profiled section blank 1 before it is divided into hollow profiled sections 6 which form the brackets 12, the blank 1 already having expanded sections 2. In addition, notches 45, which after the dividing operation form the gaps 8 (cf. FIG. 2), are produced in the hydroforming tool, while the hydroforming pressure is still present, by means of suitable rams. The division is carried out by dividing cuts running transversely with respect to the longitudinal extent of the blank 1, which on the one hand run through the middle of the expanded section 2 and on the other hand run between the notches 45a and 45b formed in pairs and axially separated from one another by a web 46. The abovementioned web 46 is completely removed during the dividing cut.

The invention claimed is:

1. A bracket (12) for a motor vehicle, said bracket adapted to being fixed to a sill of the motor vehicle via flanges, said bracket having an opening (16) adapted for receiving a receiving element, said bracket (12) comprising:

a hollow profiled section (6) having a first end (7) proximate to the sill and a second end (10) remote from the sill and being in the form of a piece of tube, a wall section at said first end (7) being notched or cut out to form wall parts (9) spaced apart from one another by gaps (8), a circular circumferential region (11) being formed at said second end (10), and a cover (13) secured to said circular circumferential region (11) and covering said second end (10) of the hollow profiled section (6) and having the opening (16) for receiving the receiving element, wherein the hollow profiled section (6) is a hydroformed part.

2. The bracket as claimed in claim 1, wherein the flanges are formed from said wall parts (9) of the hollow profiled section (6).

3. The bracket as claimed in claim 1, wherein the cover (13) has a sleeve-like extension, by means of which the cover (13) is fitted onto said circular circumferential region (11) of the hollow profiled section (6).

4. The bracket as claimed in claim 1, wherein the cover (13) has a base region (17) which is substantially planar in form.

5. The bracket as claimed in claim 1, wherein the cover (13), in the installed position of the bracket (12) on the motor vehicle (30), is oriented parallel to the roadway over the entire base region (17).

6. The bracket as claimed in claim 4, wherein the cover (13) has beads (18) in the base region (17).

7. The bracket as claimed in claim 1, wherein the cover (13) has positioning holes (19) for a mounting device in the base region (17).

8. The bracket as claimed in claim 7, wherein the positioning holes (19) are of different sizes.

9. The bracket as claimed in claim 1, wherein the opening (16) in the cover (13) is delimited by a collar (20) set toward the hollow profiled section (6).

10. The bracket as claimed in claim 1, wherein the receiving element is formed by a stopper (21), which consists of plastic.

11. The bracket as claimed in claim 10, wherein the stopper (21), on its side (22) facing the cover, has at least one clip element (23) which interacts in a connecting manner with the opening (16) in the cover (13).

12. The bracket as claimed in claim 10, wherein a circumferential outer side (24) of the stopper (21), in the securing position, is one of flush with a cylindrical edge (15) of the cover (13) and is set back therefrom.

13. The bracket as claimed in claim 10, wherein an end side (25) of the stopper (21) which is remote from the cover is pre-offset downward with respect to surrounding components, which are critical in terms of damage, of the motor vehicle (30).

14. The bracket as claimed in claim 1, wherein the contour of the wall parts (9), which form connecting flanges, of the hollow profiled section (6) and the contour of the sill (26) are designed to be of corresponding shape to one another in the attachment region of the bracket (12).

15. The bracket as claimed in claim 1, wherein the bracket (12) is located outside a component separation between a sill panel (27) and an underbody panel (28) of the motor vehicle (30), the bracket (12) with the receiving element (21) projecting through an opening (44) in the underbody panel (28).

16. A process for producing a bracket of a motor vehicle which is adapted to being fixed to a sill of the motor vehicle by flanges and has an opening (16) for receiving a receiving element (21), comprising, in any order:

forming a hollow profiled section (6) from a tubular blank (1), which is expanded by means of hydroforming, the hydroforming pressure forming at least two expanded sections (2), which are axially spaced apart from one another, from the blank (1), which sections (2) are then divided into separate hollow profiled sections (6) by a dividing process, wherein the hollow profiled section (6) is formed with a first end (7) proximate to the sill and a second end (10) remote from the sill, wall section at the first end (7) being notched or cut out to form wall parts (9) spaced apart from one another by gaps (8), and a circular circumferential region (11) is formed at the second end (10), assembling the bracket (12) from the hollow profiled section (6) and a cover (13) which covers the hollow profiled section (6) at the second end, and forming the opening (16) in the cover (13).

17. The process as claimed in claim 16, wherein the blank (1), following the shaping operation, is divided between the expanded sections (2), transversely with respect to a longitudinal axis (5) of the blank, to form individual blank sections, and then the individual blank sections are divided approximately in the middle, by a further dividing process taking place transversely with respect to the axial extent of the blank section, into in each case two hollow profiled sections (6).

18. The process as claimed in claim 16, wherein unexpanded ends (4) of the blank (1) are cut off after the shaping operation.

19. The process as claimed in claim 16, wherein at least some (9a) of the wall parts (9), which are spaced apart from one another by the gap (8) and form residual flanges, are angled off.

20. The process as claimed in claim 16, wherein the notching takes place during or following the hydroforming of the hollow profiled section (6), with the hydroforming pressure still present in the hydroforming tool.

21. The process as claimed in claim 16, wherein a sheet-metal section is deep-drawn to form the cover (13), and wherein the cover (13) is centrally perforated by stamping.

22. The process as claimed in claim 21, wherein the cover (13) is fitted onto the hollow profiled section (6) and is then joined to the hollow profiled section (6) by welding, in the region of an end face (14) of a cylindrical edge (15) of the cover (13).

* * * * *